(12) United States Patent
Saito

(10) Patent No.: US 7,721,625 B2
(45) Date of Patent: May 25, 2010

(54) HARMONIC GEAR DRIVE

(75) Inventor: Yasuji Saito, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 515 days.

(21) Appl. No.: 11/709,766

(22) Filed: Feb. 23, 2007

(65) Prior Publication Data

US 2007/0204723 A1    Sep. 6, 2007

(30) Foreign Application Priority Data

Mar. 1, 2006   (JP) .............................. 2006-054323

(51) Int. Cl.
*F16H 49/00* (2006.01)
(52) U.S. Cl. ........................................................ 74/640
(58) Field of Classification Search ................... 74/640
See application file for complete search history.

(56) References Cited

U.S. PATENT DOCUMENTS

| 6,615,689 B2 * | 9/2003 | Kobayashi .................... 74/640 |
| 2003/0233909 A1 * | 12/2003 | Tanioka ....................... 74/640 |

FOREIGN PATENT DOCUMENTS

| JP | 10-110790 | 4/1998 |
| WO | 98-53224 | 11/1998 |

* cited by examiner

*Primary Examiner*—Sherry L Estremsky
*Assistant Examiner*—Edwin A. Young
(74) *Attorney, Agent, or Firm*—Squire, Sanders & Dempsey, LLP

(57) ABSTRACT

A harmonic gear drive includes: a rigid spline; a flexspline including an attachment portion, teeth, and a thin-walled flexible portion provided between the attachment portion and the teeth; and a member attached to the thin-walled flexible portion. The member is made of a material whose elastic modulus is lower than that of the flexspline.

9 Claims, 3 Drawing Sheets

US 7,721,625 B2

HARMONIC GEAR DRIVE

CROSS REFERENCE TO RELATED APPLICATIONS

This application claims the foreign priority benefit under Title 35, United States Code, §119(a)-(d) of Japanese Patent Application No. 2006-054323 filed on Mar. 1, 2006 in the Japan Patent Office, the disclosure of which is herein incorporated by reference in its entirety.

BACKGROUND OF THE INVENTION

The present invention relates to a harmonic gear drive, which is compact in size and light-weighted, and which can realize high positional accuracy and high gear reduction ratios. More particularly, the present invention relates to a harmonic gear drive, which is suitable for applications in the field of automated machinery such as an articulation driving portion for a robot where silence and smoothness of driving are required, a semiconductor manufacturing device, and reduction gears for a precision actuator, and in the field of aerospace technology such as a control mechanism and a driving mechanism.

Harmonic gear drive is a mechanical reduction gear device for the transmission of power, which is light and compact and can realize high positional accuracy and high gear reduction ratios without employing any complicated mechanism and structure and with free of backlash. The harmonic gear drive is known as a mechanical reduction gear device including a flexspline (flexible gear).

Typically, the conventional harmonic gear drive consists of a rigid circular outer spline with internal teeth, a flexspline with external teeth partly meshed with the internal teeth of the circular spline in a flexible meshing manner, and a wave generator for displacing the meshing points of those internal teeth and external teeth in the circumferential direction for the different number of teeth by means of elastic flexibility. This type of conventional harmonic gear drive is disclosed, for example, in Japanese Laid-open Patent Application No. 10-110790 (paragraphs [0002] to [0003]; FIGS. 1 and 2), which is also referred to as Patent reference 1.

As seen in FIGS. 4 and 5, the harmonic gear drive 100 disclosed in the above Patent reference 1 comprises a rigid circular outer spline 200 with internal teeth, a flexspline 300 positioned inside the circular spline 200 and including external teeth, and an oval-shaped wave generator 400 fitted into the flexspline 300 through a bearing. The flexspline 300 includes a cylindrical portion 310, an annular diaphragm portion 320 continuously extending from the proximal side of the cylindrical portion 310, a boss (attachment portion) 330 formed in the center of and integrally with the diaphragm portion 320, and external teeth 340 formed on the outer peripheral surface of an open end portion which is positioned at the distal end of the cylindrical portion 310.

When the wave generator 400 is rotated by the rotation of the motor rotation shaft of the drive source, the flexspline 300 undergoes elastic deformation together with the outer race of the bearing which allows elastic deformation, so that the meshing points between the external teeth 340 of the flexspline 300 and the internal teeth of the rigid circular outer spline 200 displace in the circumferential direction. In general, since the rigid circular outer spline 200 is fixed to a stationary member, a rotation force is output from the boss (attachment portion) 330 of the flexspline 300 while the speed is greatly reduced in accordance with the difference of the number of teeth between the external teeth and the internal teeth.

In the flexspline 300, the cylindrical portion 310 which allows elastic deformation and the annular diaphragm portion 320 are joined together via a bent portion extending from the proximal end of the cylindrical portion 310 in the direction radially and inward toward the center of the boss 330. The flexspline 300 includes the annular boss (attachment portion) 330 integral with and positioned at the inner periphery of the diaphragm portion 320, and the external teeth 340 formed on the outer peripheral surface of the open end portion which is positioned at the distal end of the cylindrical portion 310.

This conventional harmonic gear drive 100 is light-weighted and has no backlash when compared with other reduction gear drives such as an involute planetary gear drive, and a cycloid planetary gear drive, and therefore it is suitable for applications where high positional accuracy is required. However, this harmonic gear drive has a drawback that it is difficult to reduce vibration generated from the meshing mechanism inside the gear drive.

In order to improve the aforementioned drawback concerning vibration characteristic of the harmonic gear drive 100 disclosed in Patent reference 1, a flat type harmonic gear drive is proposed in which an axial length of the cylindrical portion 310 except for the part where the external teeth 340 are provided is set smaller than the length of the diaphragm portion 320 in the radial direction. This flat type harmonic gear drive is disclosed in Domestic re-publication of WO98/53224 (pages 6-7; FIG. 1), which is also referred to as Patent reference 2.

The flay type harmonic gear drive disclosed in Patent reference 2 is a flat-shaped harmonic gear drive with large outside dimension and small axial length. According to this flat type harmonic gear drive, it is possible to decrease an occurrence of vibration while maintaining advantages of the harmonic gear drive such as improvements in rigidity, damping capacity and gear accuracy, and lightness and compactness in size.

However, the harmonic gear drive 100 as disclosed in Patent reference 1 has a drawback that since the meshing between the rigid circular outer spline 200 and the flexspline 300 is performed by the rotation of the wave generator 400, it is difficult to restrict an occurrence of high-pitched noise caused by the meshing mechanism.

In the harmonic gear as disclosed in Patent reference 2, the drawback concerning the vibration characteristic of the harmonic gear drive 100 according to Patent reference 1 may be improved. However, since rigidity and damping capacity of the harmonic gear drive 100 are maintained at high level, a problem for noise reduction at a drive part still remains, for instance, on application of robots where silence and flexibility are required.

In order to provide a flexible meshing gear of the harmonic gear drive, a thin-walled flexible portion of the flexspline which allows elastic deformation has to be thin-walled with high-strength. For this reason, high responsive control to the components of the harmonic gear drive results in a vibration inducing source so that the thin-walled flexible portion vibrates and a resonance phenomenon is caused in the cylindrical portion. Therefore, as described above in the prior art, it is difficult to solve the drawbacks both in vibration and noise.

When the harmonic gear drive is applied for a robot, resonance occurs at the cylindrical portion of the thin-walled portion of the driven unit due to frequency responsive to the rotation speed of the motor that is connected to the wave generator, which leads to a noise problem. As a result, the harmonic gear drive fails to achieve silent driving and affects fatigue of the components, which makes it worse to realize the merchantability. For instance, if the characteristic value of the vibration frequency for the flexspline is more or less 200 Hz, the motor rotation speed of the drive source is 6000 rpm (100 Hz), and the control responsive frequency is 1 KHz, resonance is liable to occur.

In view of the above, the present invention seeks to provide a harmonic gear drive which can reduce vibration and noise caused by meshing between the components which consist of the meshing mechanism of the harmonic gear drive.

SUMMARY OF THE INVENTION

According to a first aspect of the present invention, there is provided a harmonic gear drive comprising: a rigid spline; a flexspline including an attachment portion, teeth, and a thin-walled flexible portion provided between the attachment portion and the teeth; and a member attached to the thin-walled flexible portion, wherein the member is made of a material whose elastic modulus is lower than that of the flexspline.

With this construction of the harmonic gear drive, it is possible to readily restrict vibration of the flexspline and thus to reduce noise.

In the aforementioned harmonic gear drive, the member with a lower elastic modulus may be attached to the thin-walled flexible portion either at a tooth plane side or at a reverse tooth plane side.

With this construction of the harmonic gear drive, it is possible to readily restrict vibration of the flexspline. Further, since the member with a lower elastic modulus is attached at one side of the thin-walled flexible portion, it is possible to improve flexibility of the flexspline.

In the aforementioned harmonic gear drive, the thin-walled flexible portion may include a cylindrical portion, and a diaphragm portion continuously extending from the cylindrical portion, and the member with a lower elastic modulus may be attached to at least either the cylindrical portion or the diaphragm portion.

With this construction of the harmonic gear drive, it is possible to readily restrict vibration of the flexspline and further to improve flexibility as well as vibration controlling effect.

In the aforementioned harmonic gear drive, the member with a lower elastic modulus may be attached to the thin-walled flexible portion at a vicinity of a maximum amplitude point of vibration generated at the cylindrical portion and the diaphragm portion of the flexspline for an amount larger than other parts.

With this construction, since vibration can be restricted at the maximum amplitude point, it is possible to improve noise reduction effect.

In the aforementioned harmonic gear drive, the maximum amplitude point may be an antinode of a primary bending vibration generated at the cylindrical portion and the diaphragm portion of the flexspline.

With this construction of the harmonic gear drive, it is possible to reduce low-frequency noise.

According to a second aspect of the present invention, there is provided a harmonic gear drive comprising: a rigid spline; a flexspline including an attachment portion, teeth, and a thin-walled flexible portion provided between the attachment portion and the teeth; and a sound absorbing member attached to the thin-walled flexible portion.

With this construction of the harmonic gear drive, it is possible to reduce resonate noise at the thin-walled flexible portion.

According to the present invention, a simple structure, in which a member made of a material whose elastic modulus is lower than that of the flexspline or a sound absorbing member is attached to the thin-walled flexible portion as a thin-walled portion of the flexspline of the harmonic gear drive, makes it possible to restrict vibration and noise caused by meshing of the flexspline which forms the meshing mechanism of the harmonic gear drive. Therefore, excellently silent driving can be achieved with a simple structure. Further, as a gear drive unit, the optimum vibration control effect and optimum noise reduction effect can be achieved when necessary in accordance with the use conditions such as a using part and necessary output power. As a result, there is provided a harmonic gear drive which improves quality and reliability of a product while maintaining flexibility and relieving fatigue of working parts.

Other features and advantages of the present invention will be apparent from the following description taken in conjunction with the accompanying drawings.

BRIEF DESCRIPTION OF THE DRAWINGS

The aspects of the present invention will become more apparent by describing in detail illustrative, non-limiting embodiments thereof with reference to the accompanying drawings, in which.

DESCRIPTION OF THE PREFERRED EMBODIMENTS

One preferred embodiment of the present invention will be described with reference to the accompanying drawings.

Figure 1:
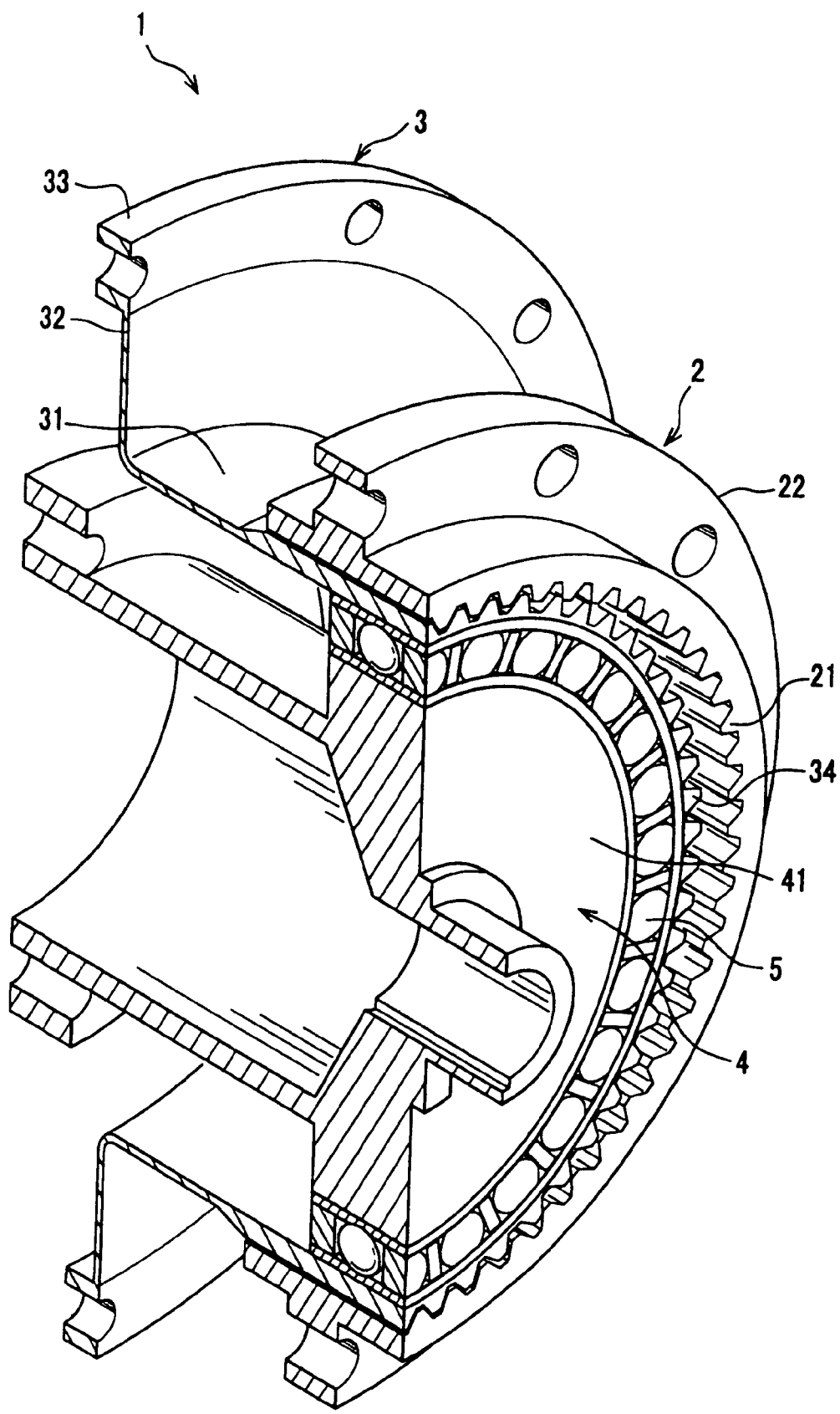
FIG. 1 is a partly sectional perspective view of a harmonic gear drive according to one embodiment of the present invention.

As shown in FIG. 1, a harmonic gear drive 1 mainly consist of a rigid circular outer spline 2, a flexible circular inner spline which allows elastic deformation (i.e., flexspline) 3, and a wave generator 4. In this harmonic gear drive 1, description of parts similar to those of the conventional harmonic gear drive will be omitted.

The rigid circular outer spline 2 includes internal teeth (teeth portion) 21 provided along the inner periphery of the circular spline 2, and a rigid gear attachment portion 22 for fixing the outer peripheral portion of the rigid circular outer spline 2 to a stationary member (not shown). The flexspline 3 includes an attachment portion 33 which is joined to a power output member (not shown), and external teeth (teeth portion) 34 meshing with the internal teeth 21 of the rigid circular outer spline 2.

The attachment portion 33 is provided at one end of the flexspline 3, and the external teeth 34 are provided at the other end of the flexspline 3. The flexspline 3 is provided with a thin-walled flexible portion which is formed into a thin-wall connecting the attachment portion 33 and the external teeth 34. At the thin-walled flexible portion is attached a member made of a material whose elastic modulus is lower than other parts of the flexspline 3 or a sound absorbing member. The sound absorbing member will be described later.

As seen in FIG. 1, the harmonic gear drive 1 is constructed such that the inner teeth 21 of the rigid circular outer spline 2 and the external teeth 34 of the flexspline 3 are meshed with each other. The wave generator 4 includes an oval-shaped cam portion 41 which forces the external teeth 34 of the flexspline 3 into an oval form, thus causing meshing of the external teeth 34 with the internal teeth 21 of the rigid circular outer spline 2 across the major axis of the oval.

Although the preferred embodiment of the present invention will be described with reference to an arrangement in which the rigid circular outer spline 2 has the inner teeth 21, the present invention is not limited to this specific arrangement. The rigid circular spline may have external teeth along its outer periphery. The flexspline 3 may have internal teeth along its inner periphery, instead of providing the external teeth along the outer periphery thereof. Further, the wave generator 4 is not limited to the specific structure of this preferred embodiment, and in place of the oval-shaped cam portion, there may be provided a wave generator which mainly consists of an electromagnet and magnetic fluid.

As seen in FIG. 1, the thin-walled flexible portion of the flexspline 3 includes a cylindrical portion 31 in the shape of a cylinder extending in the axial direction of the flexspline 3, and a diaphragm portion 32 radially and continuously extending from the proximal end of the cylindrical portion 31.

The attachment portion 33 of the flexspline 3 continuously extends further from the diaphragm portion 32 in the radially external or internal direction and is formed into an annular form. In this preferred embodiment, as seen in the drawings, the attachment portion 33 is explained as an annular attachment portion extending in the radially external direction of diaphragm portion 32.

The entire body of the flexspline 3 may be made of a flexible material. However, at least the thin-walled flexible portion including the cylindrical portion 31 and the diaphragm portion 32 is made of a flexible material and is formed to be thin-walled, so as to undergo elastic deformation. Meanwhile, the annular attachment portion 33 is thick-walled and has a plurality of attachment holes for the insertion of bolts. The external teeth 34 of the flexspline 3 are also formed to undergo elastic deformation.

At the teeth portion formed on the distal end of the cylindrical portion 31 along the outer peripheral surface of the open end portion of the flexspline 3 are formed external teeth 34 which extend in the radially external direction. In order to form the external teeth 34, the end portion of the flexspline 3 is slightly thicker than the main body of the cylindrical portion 31. The diaphragm portion 32 is joined to the cylindrical portion 31 via a bent portion 35 extending from the proximal end of the cylindrical portion 31. Therefore, the diaphragm portion 32 continuously extends in the radial direction from the proximal end of the cylindrical portion 31. Further, the attachment portion 33 continuously extends in the radial direction from the diaphragm portion 32.

The rigid circular outer spline 2 is made of a rigid material, and at the teeth portion provided along the inner peripheral surface of the circular spline 2 are formed internal teeth 21 which extend in the radially internal direction. The internal teeth 21 of the rigid circular outer spline 2 partly mesh with the external teeth 34 of the flexspline 3 by means of a flexible bearing 5 fitted onto the oval-shaped cam portion 41 of the wave generator 4.

The wave generator 4 includes the cam portion 41, and is fixed to the rotation shaft of a motor (not shown) or the like. The cam portion 41 is formed into an oval form such that the outer peripheral surface of the cam portion 41 provides a cam action by the rotation of the motor or the like.

The cam portion 41 functions to deform the external teeth 34 of the flexspline 3 in the radial direction and to force them into meshing engagement partly with the inner teeth 21 of the rigid circular outer spline 2.

Figure 2:
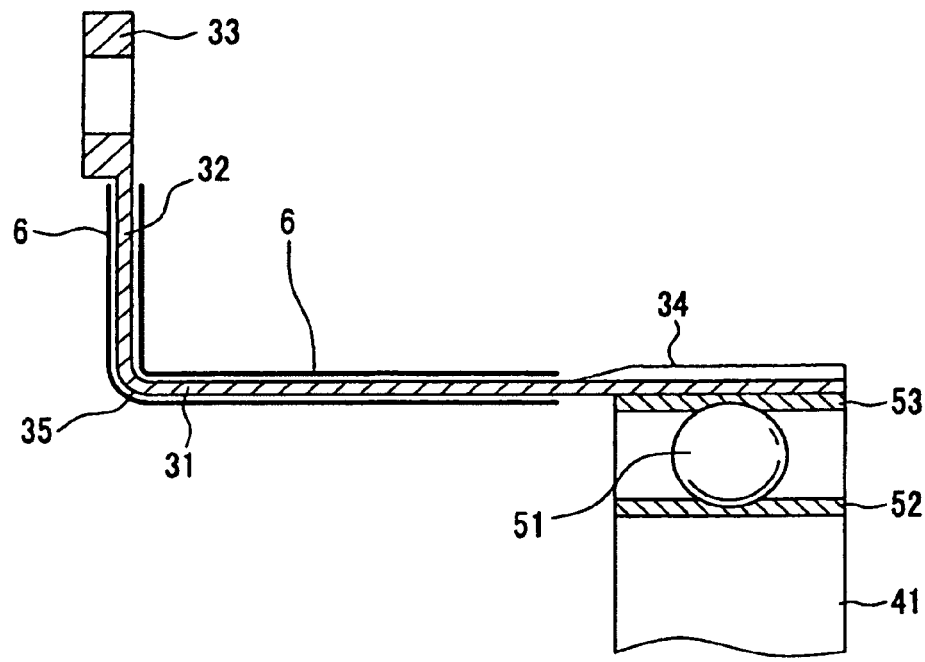
FIG. 2 is a schematic view illustrating a main part of the flexspline of the harmonic gear drive.

As shown in FIG. 2, the flexspline 3 is constructed such that the thin-walled flexible portion is integrally formed from the cylindrical portion 31, the bent portion 35, and the diaphragm portion 32.

The bearing 5 includes rolling elements 51 retained by the retainer, an inner race 52, and an outer race 53. The inner race 52 of the bearing 5 is fixed to the outer periphery of the cam portion 41 of the wave generator 4, and the outer race 53 is fitted into the reverse surface of the teeth portion (external teeth 34) provided at the open end portion which is positioned at the distal end of the cylindrical portion 31 of the flexspline 3. The outer race 53 of the bearing 5 is elastically deformable.

In the flexspline 3, an elastic member 6 made of a material whose elastic modulus is lower than that of the flexspline 3 is attached entirely or partly on one surface or both surfaces of the cylindrical portion 31 and the diaphragm portion 32 of the thin-walled portion. The elastic member 6 may be attached at least either on the cylindrical portion 31 or on the diaphragm portion 32.

In FIG. 2, a pair of elastic members 6 in the form of a sheet is attached entirely on both surfaces of the thin-walled flexible portion including the cylindrical portion 31 and the diaphragm portion 32. If the elastic member 6 is partly attached on the thin-walled flexible member, it may be attached on any positions where necessary. However, in order to achieve the maximum vibration controlling effect, it is desirable that the elastic member 6 is attached to the thin-walled flexible portion of the flexspline 3 at the vicinity of the maximum amplitude point of vibration generated at the cylindrical portion 31 or the diaphragm portion 32 for the amount larger than other parts, for instance, by partly increasing the thickness of the elastic member 6.

In this instance, if the part where the amount of the elastic member 6 is increased is the antinode of the primary bending vibration, at which the amplitude of vibration takes the maximum amplitude point, it is possible to further reduce low-frequency noise.

Figure 3:
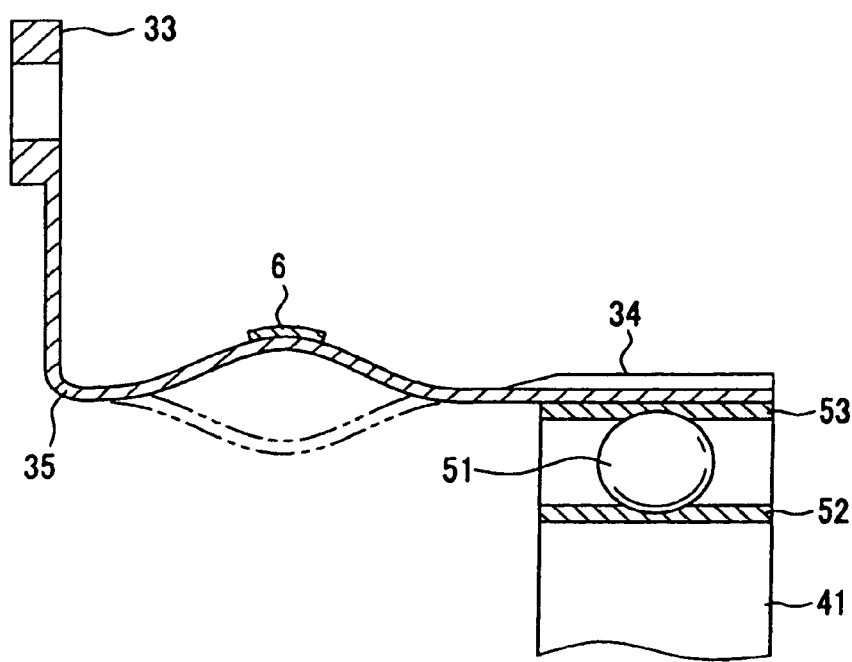
FIG. 3 is a schematic view conceptually illustrating a primary bending vibration of the flexspline of the harmonic gear drive.
Figure 4:
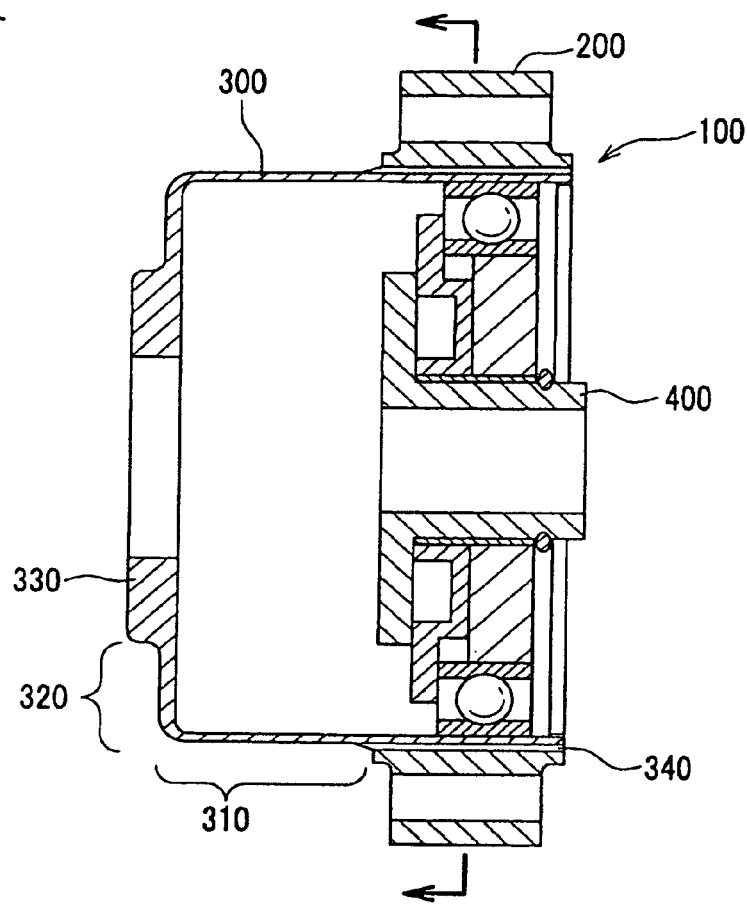
FIG. 4 is a sectional view of the conventional harmonic gear drive.
Figure 5:
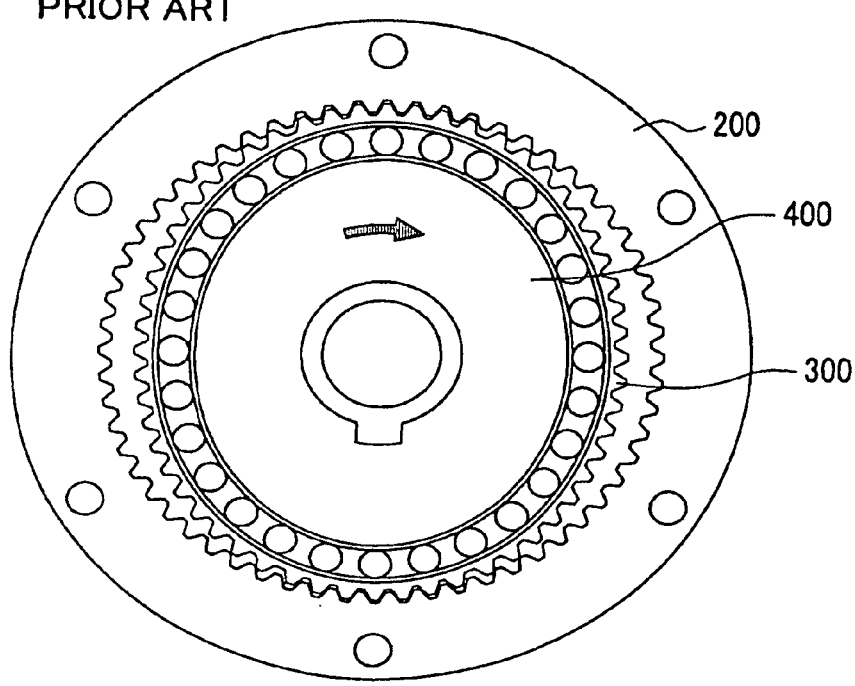
FIG. 5 is a side elevational view of the conventional harmonic gear drive.

In FIG. 3, the primary bending vibration of the flexspline 2 is shown in a schematic manner. This figure conceptually illustrates an example, in which the elastic member 6 whose thickness is greater than the sheet-like elastic member 6 shown in FIG. 2 is partly attached on the cylindrical portion 31 to an area around the antinode that is the maximum amplitude point of the primary bending vibration at the tooth plane side of the external teeth 34. The elastic member 6 extends continuously along the periphery of the cylindrical portion 31.

Although not shown in the drawings, the elastic member 6 may be attached to the cylindrical portion 31 at the reverse tooth plane side. The elastic member 6 may also be attached partly on both sides of the cylindrical portion 31. As long as the elastic member 6 is attached to the vicinity of the area around the maximum amplitude point of the vibration, even with the partly attachment of the elastic member 6, the vibration can be restricted at or around the maximum amplitude point, which can improve the noise reduction effect.

Further, as shown in FIG. 3, if the elastic member 6 is attached to the antinode of the primary bending vibration at which the amplitude of vibration takes the maximum amplitude point, it is possible to selectively reduce low-frequency noise.

According to the present invention, the wording "the elastic member 6 is partly attached" also means that the elastic member 6 in the shape of a strip extends in the axial direction or in the annular or peripheral direction and that the elastic member 6 has a non-continuous pattern such as a staggered pattern. Further, in terms of the cylindrical portion 31 and the diaphragm portion 32 of the thin-walled flexible portion, the tooth plane side indicates the side of the surface where the external teeth 34 are provided, and the reverse tooth plane side indicates the reverse side of the surface where the external teeth 34 are provided.

Preferably, the elastic member 6 (material with a lower elastic modulus) may be in the form of a sheet such as made of rubber, resin and fiber, and provide vibration controlling property and vibration absorbing property. Particularly, the elastic member 6 is preferably made of a material having vibration damping property which is capable of restricting oscillation frequency and resonance frequency associated with vibration of the thin-walled flexible portion. Further, although the elastic member 6 may be made of a material having mass and vibration controlling and vibration absorbing properties relative to the thin-walled flexible portion, it is preferable that the material is relatively thin. The same material with a lower elastic modulus may be used for both the cylindrical portion 31 and the diaphragm portion 32. However, a different material may be used for the cylindrical portion 31 and the diaphragm portion 32, respectively, in consideration of vibration controlling property and vibration absorbing property.

Attachment of the elastic member 6 may be performed by any known means or methods, such as mechanical fixing, coating or baking of a fluid material, cure adhesion, coating of a solid material or a sheet-like/film-like material, and attaching with adhesive.

Operation of Harmonic Gear Drive

Operation of the harmonic gear drive will be described below.

When the wave generator 4 is driven by the motor or the like, the cam portion 41 of the wave generator 4 is rotated through the input shaft (not shown). By the rotation of the cam portion 41, the cylindrical portion 31 of the flexspline 3 is deflected into an oval form and continuously deformed through the outer race 53 of the bearing 5 which is elastically deformable by the cam portion 41. During this time, the meshing points of the external teeth 34 of the flexspline 3 and the internal teeth 21 of the rigid circular outer spline 2 are sequentially displaced in the circumferential direction.

The number of teeth is different between the rigid circular outer spline 2 and the flexspline 3. With respect to the meshing points of the internal teeth 21 of the rigid circular outer spline 2 and the external teeth 34 of the flexspline 3, a relative rotation occurs between the circular spline 2 and the flexspline 3 in accordance with the different number of teeth, that is four in this preferred embodiment. Since the rigid circular outer spline 2 is fixed not to allow the relative rotation, a rotation force is transmitted and output from the flexspline 3 to the output side (not shown) while the speed is greatly reduced in accordance with the different number of teeth.

According to the operation of the harmonic gear drive 1, the cylindrical portion 31 of the flexspline 3 is elastically deformed through the elastically deformable outer race 53 of the bearing 5. Therefore, a pre-load is generated such that the external teeth 34 of the flexspline 3 are urged toward the inner teeth 21 of the rigid circular outer spline 2, which can absorb a play between the external teeth 34 and the internal teeth 21 as well as decrease backlash.

During the drive of the harmonic gear drive 1 when the thin-walled flexible portion of the flexspline 3 is deflected into an oval form and continuously deformed by the cam portion 41 of the wave generator 4, vibration occurs and vibration noise is induced due to the meshing engagement between the flexspline 3 and the rigid circular outer spline 2. When the vibration reaches the resonance point, a noise occurs due to resonance generated in a space surrounded by the thin-walled flexible portion and peripheral members.

In this instance, since the elastic member 6 made of a material with a lower elastic modulus is attached to the cylindrical portion 31 and/or the diaphragm portion 32 as the thin-walled flexible portion, the resonance point of the natural frequency in the gear drive unit can be restricted to a lower value, and therefore, it is possible to restrict resonance of the vibration and a noise generated by the resonance in a space surrounded by the thin-walled flexible portion and peripheral members. Especially, if the elastic member 6 is attached to the vicinity of the maximum amplitude point of the primary bending vibration, a large vibration can be restricted at the vicinity of the maximum amplitude point, to thereby improve the noise reduction effect. If the elastic member 6 is attached to the antinode of the primary bending vibration at which the amplitude of vibration takes the maximum amplitude point, it is possible to selectively reduce low-frequency noise.

According to this preferred embodiment, the elastic member 6 as means for decreasing vibration is made of a material whose elastic modulus is lower than that of the flexspline 3. Further, the elastic modulus of the elastic member 6 is preferably set to a value which can attenuate the oscillation frequency of the thin-walled flexible portion consisting of the cylindrical portion 31 and the diaphragm portion 32 of the flexspline 3.

As described above, the elastic member 6 with a lower elastic modulus may be attached on the reverse tooth plane side, instead of attaching on the tooth plane side, or on both the tooth plane side and the reverse tooth plane side.

Further, in place of the elastic member 6, a sound absorbing member made of woven or nonwoven fabric such as felt may be employed. In this preferred embodiment, the sound absorbing member made of a sound absorbing material is referred to in FIGS. 2 and 3 by the same reference numeral 6 as the elastic member 6. The sound absorbing member 6 will be described below.

By the similar means or methods for attaching the elastic member 6, the sound absorbing member 6 made of the sound absorbing material may be attached at least either on the tooth plane side or the reverse tooth plane side of the thin-walled flexible portion. Attachment of the sound absorbing member 6 makes it possible to reduce the noise generated by the resonance in a space surrounded by the thin-walled flexible portion and peripheral members. The sound absorbing member 6 may be attached only partly to the cylindrical portion 31. In FIGS. 2 and 3, the sound absorbing member and the elastic member are denoted by the same reference numeral 6.

Attachment of the elastic member 6 made of a material with a lower elastic modulus or the sound absorbing member 6 made of a sound absorbing material relative to the thin-walled flexible portion may be performed by any known means or methods, such as mechanical fixing and attachment with adhesive. With the simple structure where the elastic member 6 or the sound absorbing member 6 is provided, the oscillation frequency at the thin-walled flexible portion can be attenuated or restricted or a noise can be absorbed at the thin-walled flexible portion. Therefore, it is possible to reduce a noise generated by resonance or the like as well as to relieve fatigue of the working parts while maintaining flexibility and improving silence of driving of the flexible meshing-type harmonic gear drive.

As described above, according to the preferred embodiment of the present invention, with the simple structure where the elastic member 6 made of a material with a lower elastic modulus is attached to the cylindrical portion and the diaphragm portion as the thin-walled flexible portion of the flexspline 3 of the harmonic gear drive 1, even if bending vibration occurs continuously at the cylindrical portion 31 and the diaphragm portion 32 of the thin-walled flexible portion by the wave-like meshing engagement with the opposite internal teeth 21 and this continuous bending vibration generates a noise, because of the vibration controlling effect of the material with a lower elastic modulus, it is possible to decrease noise and fatigue of the working parts while maintaining flexibility.

Further, according to the preferred embodiment of the present invention, with the simple structure where the sound absorbing member 6 made of a sound absorbing material is attached to the flexspline of the harmonic gear drive 1, because of the sound absorbing effect of the sound absorbing material, it is possible to restrict an occurrence of the resonance phenomenon and therefore to decrease noise and fatigue of the working parts while maintaining flexibility.

According to the present invention, with a simple structure where the elastic member 6 with a lower elastic modulus or the sound absorbing member 6 is attached to the flexspline 3 of the harmonic gear drive 1, the optimum vibration controlling effect and optimum noise reduction effect for resonance can be achieved when necessary in accordance with the use conditions such as a using part to which is mounted the harmonic gear drive 1 as a gear drive unit such as an articulation driving portion for a robot, and necessary output power.

What is claimed is:

1. A harmonic gear drive comprising:
   a rigid spline;
   a flexspline including an attachment portion, teeth, and a thin-walled flexible portion provided between the attachment portion and the teeth; and
   a member attached to the flexspline along the thin-walled flexible portion, wherein the member is made of a material whose elastic modulus is lower than that of the flexspline.

2. A harmonic gear drive according to claim 1, wherein the member with a lower elastic modulus is attached to the thin-walled flexible portion either at a tooth plane side or at a reverse tooth plane side.

3. A harmonic gear drive according to claim 2, wherein the thin-walled flexible portion includes a cylindrical portion, and a diaphragm portion continuously extending from the cylindrical portion, and the member with a lower elastic modulus is attached to at least either the cylindrical portion or the diaphragm portion.

4. A harmonic gear drive according to claim 3, wherein the member with a lower elastic modulus is attached to the thin-walled flexible portion at a vicinity of a maximum amplitude point of vibration generated at the cylindrical portion and the diaphragm portion of the flexspline, and wherein the member, both at the vicinity of the maximum amplitude point and at the diaphragm portion, is provided with an amount of material larger than at other parts of the member.

5. A harmonic gear drive according to claim 4, wherein the maximum amplitude point is an antinode of a primary bending vibration generated at the cylindrical portion and the diaphragm portion of the flexspline.

6. A harmonic gear drive according to claim 1, wherein the thin-walled flexible portion includes a cylindrical portion, and a diaphragm portion continuously extending from the cylindrical portion, and the member with a lower elastic modulus is attached to at least either the cylindrical portion or the diaphragm portion.

7. A harmonic gear drive according to claim 6, wherein the member with a lower elastic modulus is attached to the thin-walled flexible portion at a vicinity of a maximum amplitude point of vibration generated at the cylindrical portion and the diaphragm portion of the flexspline, and wherein the member, both at the vicinity of the maximum amplitude point and at the diaphragm portion, is provided with an amount of material larger than at other parts of the member.

8. A harmonic gear drive according to claim 7, wherein the maximum amplitude point is an antinode of a primary bending vibration generated at the cylindrical portion and the diaphragm portion of the flexspline.

9. A harmonic gear drive comprising:
   a rigid spline;
   a flexspline including an attachment portion, teeth, and a thin-walled flexible portion provided between the attachment portion and the teeth; and
   a sound absorbing member attached to the flexspline along the thin-walled flexible portion.

* * * * *